Aug. 30, 1949.  F. O. WISMAN ET AL  2,480,802
ELECTROMAGNETIC SPEED SENSING DEVICE
Filed Sept. 7, 1945  3 Sheets-Sheet 1

INVENTORS
FRANKLIN O. WISMAN
INGWALD ANDREASEN
BY Cecil F. Arens
ATTORNEY

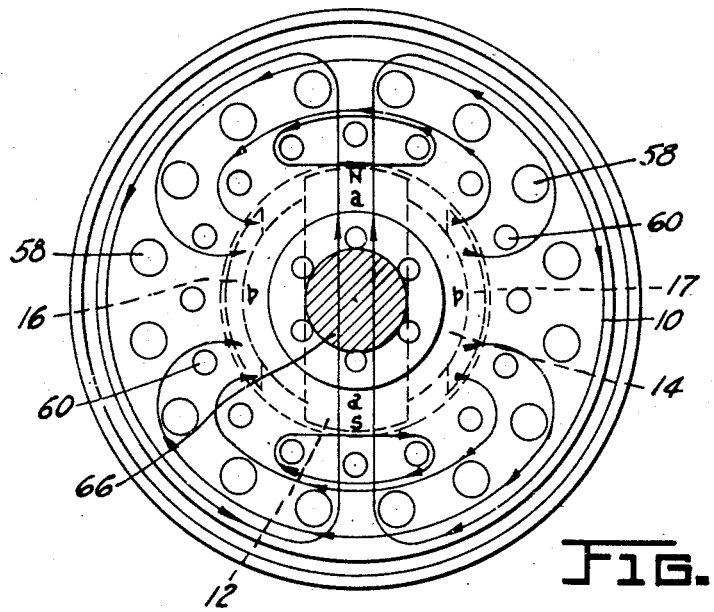
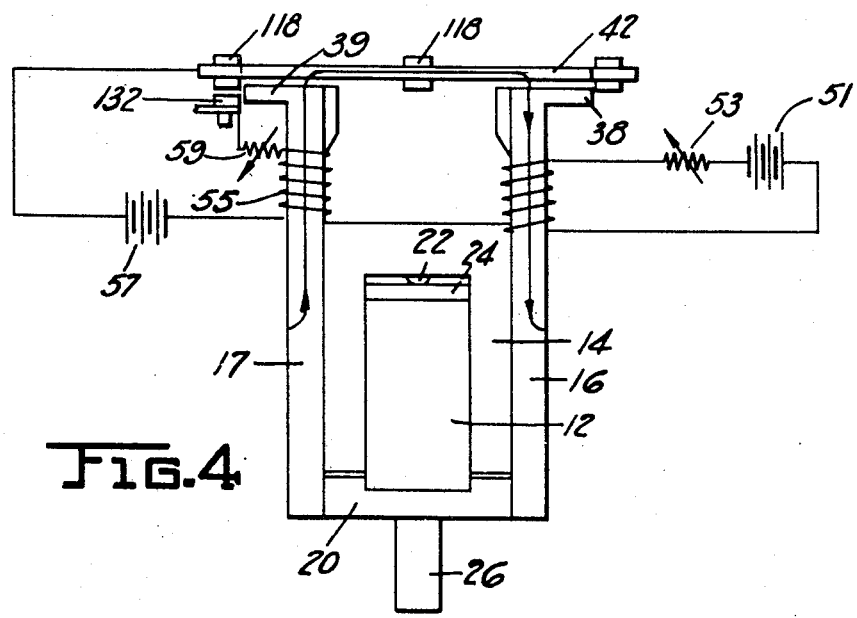

Aug. 30, 1949.　　　　F. O. WISMAN ET AL　　　　2,480,802
ELECTROMAGNETIC SPEED SENSING DEVICE

Filed Sept. 7, 1945　　　　　　　　　　　　3 Sheets-Sheet 3

INVENTORS
FRANKLIN O. WISMAN
INGWALD ANDREASEN
BY
Cecil J. Arens
ATTORNEY

UNITED STATES PATENT OFFICE 2,480,802

ELECTROMAGNETIC SPEED SENSING DEVICE

Franklin O. Wisman and Ingwald Andreasen, South Bend, Ind., assignors to Bendix Aviation Corporation, South Bend, Ind., a corporation of Delaware Application September 7, 1945, Serial No. 615,038

15 Claims. (Cl. 175—336)

This invention relates to speed sensing devices of a type utilizing the armature reaction of a dynamoelectric machine for controlling a member which is responsive to the speed of the driving apparatus.

The Rosenberg generator is one of the earliest of dynamoelectric machines to utilize armature reaction flux produced by current flowing between two sets of brushes for obtaining designated characteristics of the machine.

It should be noted, however, that the only similarity between the device of the present invention and the Rosenberg generator resides in the fact that both devices utilize the phenomenon of armature reaction. The dynamoelectric machine which will be presently described differs principally from the aforementioned machine in its absence of a commutator and brushes. In the design of a conventional dynamo the interpolar regions are proportioned so as to maximize the reluctance of the magnetic circuit presented to armature reaction flux. This minimizes the amount of flux produced and the resultant field distortion. The device of the invention contemplates utilizing this cross flux in the armature between the main poles by inserting collector poles between the main poles. These collector poles have surfaces adjacent the rotor or rotating member to thereby provide a path of low reluctance for the cross axis flux. This cross axis flux tends to be proportional to the speed of the rotor. The cross flux is caused to link with a movable member which is to be operated in response to a predetermined field intensity which is a function of the rotor speed.

An important object of the invention resides in the provision of a speed sensing device which depends upon the field intensity through a given path for its operation.

Another important object of the invention lies in the provision of a dynamoelectric machine which depends upon armature reaction for operating a member which responds at one or more predetermined speeds of its driving apparatus.

A further object of the invention resides in the provision of a dynamoelectric machine for determining the rotational speed of its driving apparatus.

The above and other objects and features of the invention will be apparent from the description of the apparatus in the accompanying drawings, in which:

Figure 3 is a section taken on the lines 3—3 of Figure 2 with the end portion removed;

Figure 4 is a view in elevation of the permanent magnet and collector poles.

Figure 1:
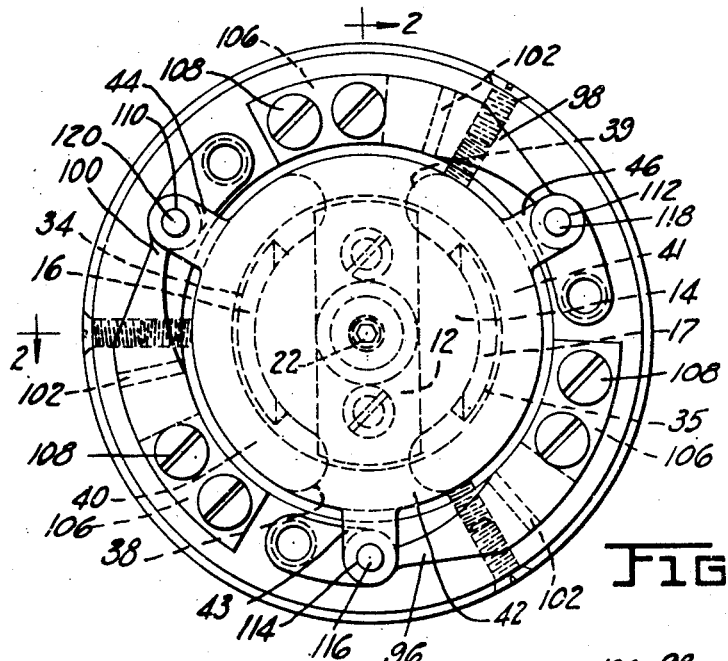
Figure 1 is an end view of one form of the device of the invention, with portions removed for purposes of clarity.
Figure 2:
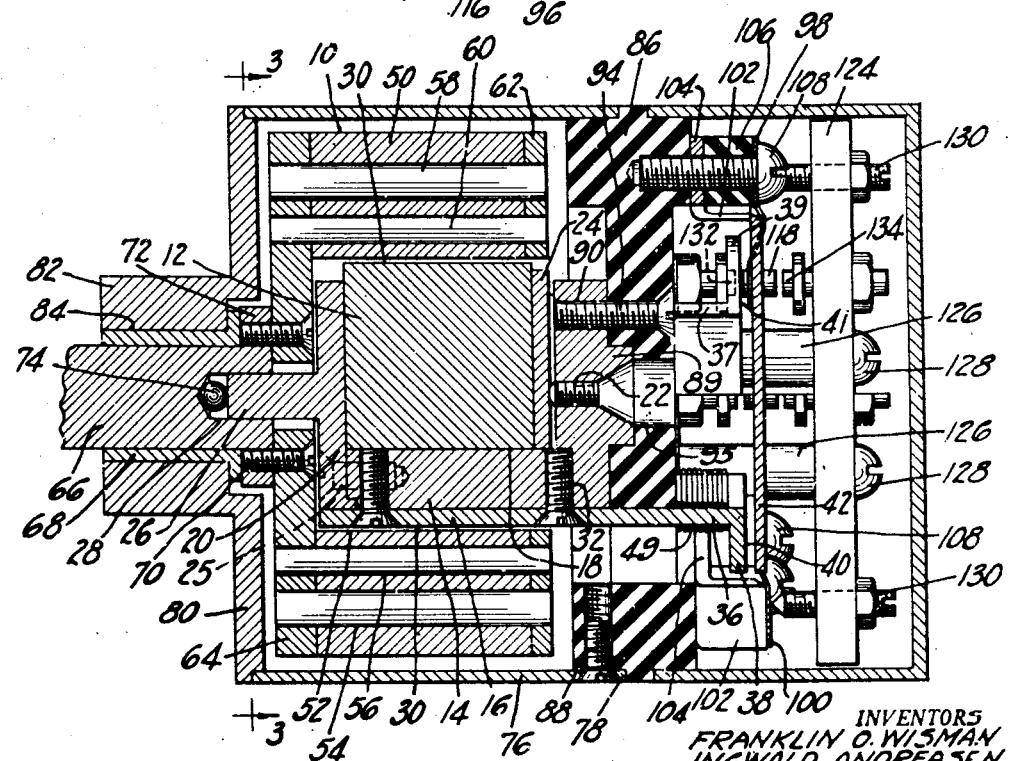
Figure 2 is a view in section taken on the lines 2—2 of Figure 1.

Referring to the drawings, Figures 1 and 2, the numeral 10 designates a rotor which is driven by an apparatus, not shown, the speed of which it is desired to determine. The driving source may be an internal combustion engine, for example, the speed of which it is necessary to know before connecting the engine to its load, or before changing the gearing ratio between the engine and load. For illustrative purposes, the machine has been shown as having a two pole excitation system, and in the present embodiment comprises a stationary permanent magnet 12 carried by a non-magnetic core 14 extending interiorly of the rotatable member or rotor 10. A pair of collector poles 16 and 17 are also carried by the core 14 and disposed radially between the poles of the permanent magnet to form a part of the magnetic circuit. The permanent magnet 12 is magnetically separate from the collector poles 16 and 17. The core 14 has a slot 18 extending transversely therethrough and longitudinally thereof from one of its ends to a point along its axis short of the other end. The slot 18 is arranged to receive the permanent magnet 12 which is held in position in the slot by a non-magnetic end piece 20 which closes one end of the slot and a set screw 22 which bears against a non-magnetic shim 24 lying along one side of the permanent magnet. The end piece 20 is held in place by screws 25 and has a stem 26 integral therewith for cooperating with a drilled portion 28 of the rotor for positioning the core with respect to the interior of the rotor to thereby maintain a substantially uniform air gap 30 between the permanent magnet 12, the collector poles 16 and 17 and the interior of the rotor. The collector poles 16 and 17 are secured to the core 14 by screws 32. These poles, which are arranged with respect to the rotor to receive the armature reaction flux in the rotor, have curved surfaces 34 and 35 extending peripherally around a portion of the interior of the rotor and protruding portions 36 and 37 extending axially beyond one end of the rotor. The portions 36 and 37 respectively of the collector poles which extend beyond the rotor are flanged outwardly at 38 and 39 to form pole faces 40 and 41. A relay armature 42 having radial projections 43, 44 and 46 is constructed and arranged to cooperate with the pole faces 40 and 41 of the poles 16 and 17 respectively to complete the magnetic circuit to be hereinafter described in more detail. A coil 49 is wound on one of the collector poles to provide an adjustment for the cross axis flux acting on the armature. The coil 49 is connected to a suitable source such as a battery 51 and thence through a rheostat 53, which may be varied to aid or oppose the cross axis MMF according to the requirements of the circuit. With this arrangement the operating speeds may be adjusted at will from some remote location by means of the variable resistor 53. The speed or dead band in rotor speed for the relay armature to pick up and drop out is inherent in this device. It is caused by an increase of cross flux as the armature air gap is reduced. In order to overcome this variable a coil 55 placed on the collector poles is connected to a battery 57 through a variable resistor 59 and contacts 118, 132. With the circuit arrangement connected through the contacts 118 and 132, as shown, the coil 55 is energized subsequent to the pick up of the armature. This permits control of the spread between pick up and drop out of the armature. Where the relay armature is designed to respond to more than one speed there is a coil for each speed, with the variable resistor being connected to adjust the spread for individual coils. This armature member is here utilized for closing an electrical power circuit but may be used for divers purposes. It is to be understood that the device is not restricted to the control of the electrical power circuit mentioned but has other important uses.

The rotor 10 of the device comprises steel laminations 50 which minimize heating, and is bored at 52 to receive the core 14, magnet 12 and collector poles 16 and 17. These laminations may be slotted, or as in this case, drilled at 54 and 56 to receive copper bars or conductors 58 and 60. The copper bars are connected at their ends by conducting links or discs 62 and 64 in much the same manner as the conductor bars of the conventional squirrel cage rotor are connected. Obviously, instead of the construction shown the rotor may be provided with wound coils of wire. A shaft 66 is fixed to the disc 64 and revolves in a bearing 68. Screws 70 extend through the disc 64 and threadedly engage a flange portion 72 of the shaft 66 to hold the shaft and rotor in assembled relationship. The shaft 66 projects beyond the bearing 68 and is constituted to be engaged by an apparatus, not shown, for rotating the same. The shaft 66 of the rotor contains the drilled portion 28 which has a greater depth than the length of stem 26 to accommodate a ball member 74 which acts as a thrust bearing for the axial movement of the rotor to the right, as viewed in Figure 2.

The rotor is enclosed in a casing 76 having one end open at 78 to receive the rotor and the other end of the casing partly closed with an end member 80 having a boss 82 drilled at 84 for the reception of the bearing 68 in which the shaft 66 revolves.

A non-metallic ring-like member 86 cooperates with the open end 78 of the casing 76 and is held securely in place by screws 88. An element 89 integral with the ring-like member 86 extends diametrically across thereof and is drilled at 90 to receive screws 94 which threadedly engage the core 14 to suspend the same into the bored portion 52 of the rotor 10. The element is also drilled at 95 so that the set screw 22 which holds the permanent magnet in place will be accessible for adjustment.

The relay armature 42 is floatably suspended adjacent the surfaces 40 and 41 of the poles 16 and 17 by cantilever springs 96, 98 and 100 carried by the ring 86. The springs are bent over upturned portions 102 of elements 104 which are mounted on the ring 86 and are spaced circumferentially about the ring. Spacers 106 are disposed between the elements and springs. The spacers 106, elements 104 and cantilever springs are held in assembled relationship by screws 108 which threadedly engage ring 86. The free ends of the springs 96, 98 and 100 have openings 110, 112 and 114 respectively therein for cooperating with electrical contact elements 116, 118 and 120 carried by the radial projections 43, 44 and 46 of the armature 42. A non-metallic disc-like member 124 is mounted on the ring 86 and spaced apart therefrom by sleeves 126 through which connecting screws 128 pass for securing the disc member 124 to the ring 86. An adjusting screw 130 is provided for each of the springs 96, 98 and 100 and is carried by the non-metallic disc 124. One end of the adjusting screw is in contact with its corresponding spring to vary the force exerted by the free end of the spring. With such an arrangement it is evident that the force necessary to pull the armature toward the collector poles may be made to vary circumferentially about the armature, depending on the spring adjustment. Contacts 132 and 134 are carried respectively by the ring 86 and disc member 124 which cooperates with the contact elements 116, 118 and 120 to control an electrical power circuit, not shown.

Figure 5:
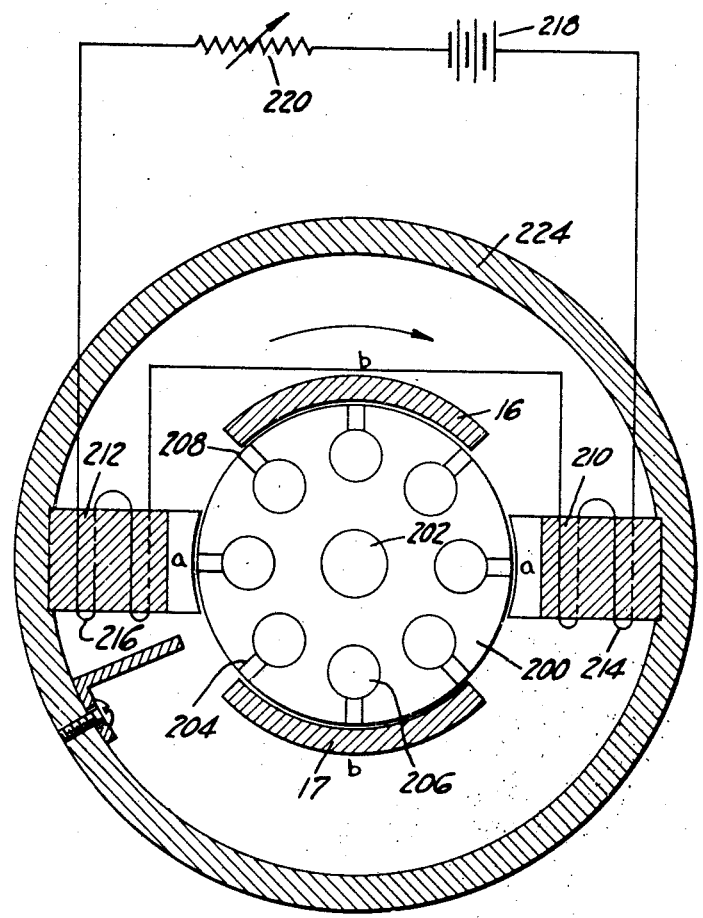
Figure 5 is a view in section of a modified form of the invention.

In the modified form of Figure 5 the numeral 200 designates a laminated rotor fixed to a shaft 202 which is connected to a driving apparatus, not shown. The rotor 200 is slotted at 204 for the reception of conductor bars 206 which are connected together at their ends by discs or rings 208. Main poles 210 and 212 have windings 214 and 216 thereon for producing the main field excitation. These windings are separately excited from a battery 218 which is connected to the windings through a rheostat 220 for varying the main field current and hence the main field exciting flux. This arrangement is particularly advantageous where it is desired to bias the operational speed of the device. By varying the rheostat the speed at which the device operates will vary. The main poles are fixed to the member 224 and diametrically spaced apart. Collector poles 16 and 17 are located between the main poles 210 and 212. The main field flux is in the direction $a$—$a$. The cross flux or armature reaction flux is in the direction $b$—$b$. The collector poles carry flanged extensions which serve as pole faces like those disclosed in the preferred embodiment, and need not be described further. Other structural features, such as the armature, the electrical contacts and the manner of mounting and assembling the same, are similar to those shown in Figure 2 and need no further explanation. In the modified form of the invention the rotor is disposed between the main poles as distinguished from the preferred embodiment in which the rotor circumscribes the main poles.

Theory and operation of the device.

With the rotor 10 at rest, the armature 42 will be urged away from the outturned portions 38 and 39 of the collector poles 16 and 17 by the springs 96, 98 and 100. Referring to Figure 3, and with the rotor in the aforementioned position, the path of the main field flux will be in the direction "a—a," that is, the magnetic circuit of the main field flux will be from the north pole of the permanent magnet across the air gap to the adjacent rotor surface where the flux divides and passes circumferentially through the rotor to the opposite side thereof where it enters the south pole of the permanent magnet. Instead of using a permanent magnet to obtain the main field flux, coil wound poles separately excited may be used, as shown in Figure 5 representing the modified form.

Rotation of the rotor 10 in the direction indicated in Figure 3 causes the conductors 58 and 60 to cut the main field flux which induces a voltage in these conductors and causes a current to flow therein in the direction shown by the arrows. The current which flows in these inductors tends to magnetize the rotor in the cross axis direction "b—b". This cross axis flux due to armature reaction in rotor 10 tends to be at right angles to the main axis flux. The cross axis flux is collected by the collector poles 16 and 17 which conduct the flux to the outturned portions 38 and 39 adjacent the armature. Since the voltage induced in the conductors is a function of their velocity through the main flux field, the current and resultant cross axis flux are dependent on the speed of the driving apparatus, that it, the R. P. M. of the rotor. With the cantilever springs adjusted to resist a predetermined pull the armature may be made to respond to preselected rotor speeds. The adjustment of the springs may be such as to require uniform pull on the armature to close the contacts simultaneously, or on the other hand the adjustment may be such as to require a progressively greater pull on each of the springs to close the contacts successively. The number of electrical contacts on the armature is determined by the application of the machine and may include a single contact or a plurality of contacts. As soon as the speed of the rotor has reached a predetermined value so that the pull on the armature, due to the cross axis flux, which is acting on the armature, exceeds the loading of the cantilever springs the armature will be drawn toward the outturned portions 38 and 39 of collector poles 16 and 17. It should be noted at this time that when the armature is drawn toward the poles, thus shortening the air gap, the pull on the armature is greatly increased. In some applications this variation in pull on the armature due to the shortening of the air gap may prove highly objectionable since it results in a spread between the operating and release speeds of the contacts. However, this spread can be controlled at will by passing current through the coil 55 which is connected to a source, such as the battery 57 through one of the electrical contacts carried by the armature. The magnetomotive force caused by the current in coil 55 can be made to either aid or oppose the cross axis magnetomotive force in the collector poles.

We claim:

1. A speed sensing device comprising a shaft to be rotated, a rotor driven by the shaft, conductors carried by said rotor, means arranged adjacent said rotor for providing a main field flux which links the conductors in a manner to be cut thereby to cause a current to flow therein when said rotor is rotated, the current which is caused to flow in said conductors produces a cross flux in said rotor acting at substantially right angles to the main field flux, said cross flux being a function of the rotor speed, and means positioned adjacent said rotor for forming a magnetic circuit for said cross flux including a member disposed in said magnetic circuit to be operated in response to a predetermined speed of said shaft.

2. A speed sensing device comprising a shaft to be rotated, a rotor driven by the shaft, conductors carried by said rotor, means providing a main field flux which links the conductors in a manner to be cut thereby to cause a current to flow therein when said rotor is rotated, the current which is caused to flow in said conductors produces a cross flux in said rotor acting at substantially right angles to the main field flux, said cross flux being a function of the rotor speed, and means forming a magnetic circuit for said cross flux including a member normally urged in a direction tending to increase the reluctance of said circuit and operative upon attainment of a predetermined speed of said shaft to move in a direction tending to decrease the reluctance of the circuit and to also respond to a preselected speed of the shaft.

3. A speed sensing device comprising a shaft to be rotated, a rotor driven by the shaft, conductors carried by said rotor, means providing a main field flux which links the conductors in a manner to be cut thereby to cause a current to flow therein when said rotor is rotated, the current which is caused to flow in said conductors produces a cross flux in said rotor acting at substantially right angles to the main field flux, said cross flux being a function of the rotor speed, means forming a magnetic circuit for said cross flux including a pair of collector poles, and an armature constructed and arranged to bridge said poles and to be moved with respect thereto in response to predetermined shaft speed.

4. A speed sensing device comprising a shaft to be rotated, a rotor driven by the shaft, conductors carried by said rotor, means providing a main field flux which links the conductors in a manner to be cut thereby to cause a current to flow therein when said rotor is rotated, the current which is caused to flow in said conductors produces a cross flux in said rotor acting at substantially right angles to the main field flux, said cross flux being a function of the rotor speed, means forming a magnetic circuit for said cross flux including a pair of collector poles, and an armature arranged to conduct said cross flux between the poles and normally spring urged away from said poles and constituted to be moved toward said poles in response to predetermined shaft speed.

5. A speed sensing device comprising a rotor to be rotated, conductors carried by said rotor, a permanent magnet providing a main field flux which links the conductors in a way to be cut thereby to induce a voltage therein to cause a current to flow in said conductors when the rotor is rotated, the current in said conductors producing a cross flux in said rotor which flux acts at substantially right angles to the main field flux, said cross flux varying with the rotor speed, a pair of poles arranged with respect to said rotor to receive said cross flux, and an armature forming a magnetic path between the poles for conducting said cross flux, said armature being normally urged away from said poles and constructed and arranged to be pulled toward said poles in response to a predetermined rotor speed.

6. A speed sensing device comprising a rotor to be rotated, conductors carried by said rotor, main poles providing a main field flux which links the conductors in such a way as to be cut thereby to induce a voltage therein to cause a current to flow in said conductors when the rotor is rotated, the current in said conductors producing a cross flux in said rotor which flux acts at substantially right angles to the main field flux, collector poles arranged between the main poles and disposed with respect to the rotor to receive said cross flux, and an armature for furnishing a magnetic path between the collector poles for conducting said cross flux therebetween, said armature being normally urged away from said collector poles and constructed and arranged to be pulled toward said poles in response to a predetermined rotor speed.

7. A speed sensing device comprising a shaft to be rotated, a rotor driven by the shaft, conductors carried by said rotor, main poles providing a main field flux which links the conductors in such a way as to be cut thereby to induce a voltage therein to cause a current to flow in said conductors when the rotor is rotated, the current in said conductors producing a cross flux in said rotor which flux acts at substantially right angles to the main field flux, collector poles arranged between the main poles and disposed with respect to the rotor to receive said cross flux, an armature for furnishing a magnetic path between the collector poles for conducting said cross flux therebetween, said armature being normally urged away from said collector poles and constructed and arranged to be pulled toward said poles in response to a predetermined shaft speed, and a separately excited winding on one pole of each pair of collector poles and constructed and arranged to produce a magnetomotive force which may be made to oppose or aid said cross flux.

8. A speed sensing device comprising a shaft to be rotated, a rotor driven by said rotor, main poles providing a main field flux which links the conductors in such a way as to be cut thereby to induce a voltage therein to cause a current to flow in said conductors when the rotor is rotated, the current in said conductors producing a cross flux in said rotor which flux acts at substantially right angles to the main field flux, collector poles arranged between the main poles and disposed with respect to the rotor to receive said cross flux, an armature for furnishing a magnetic path between the collector poles for conducting said cross flux therebetween, said armature being normally urged away from said collector poles and constructed and arranged to be pulled toward said poles in response to a predetermined shaft speed, and a separately excited winding for one pole of each pair of collector poles and constructed and arranged to be excited in response to movement of the armature toward the collector poles so as to produce a magnetomotive force which will oppose or aid the cross flux in order to control the speed between pick up and drop out of the armature.

9. A speed sensing device comprising a shaft to be rotated, a rotor driven by the shaft, conductors carried by said rotor, main poles providing a main field flux which links the conductors in such a way as to be cut thereby to induce a voltage therein to cause a current to flow in said conductors when the rotor is rotated, the current in said conductors producing a cross flux in said rotor which flux acts at substantially right angles to the main field flux, collector poles arranged between the main poles and disposed with respect to the rotor to receive said cross flux, an armature for furnishing a magnetic path between the collector poles for conducting said cross flux therebetween, said armature being normally urged away from said collector poles and constructed and arranged to be pulled toward said poles in response to a predetermined shaft speed, and a separately excited winding for one pole of each pair of collector poles and constructed and arranged to produce a magnetomotive force which opposes or aids the cross flux to control the operating speeds to which the armature will respond.

10. A speed sensing device comprising a shaft to be rotated, a rotor driven by the shaft, conductors carried by said rotor, main poles providing a main field flux which links the conductors in such a way as to be cut thereby to induce a voltage therein to cause a current to flow in said conductors when the rotor is rotated, the current in said conductors producing a cross flux in said rotor which flux acts at substantially right angles to the main field flux, collector poles arranged between the main poles and disposed with respect to the rotor to receive said cross flux, an armature for furnishing a magnetic path between the collector poles for conducting said cross flux therebetween, and means suspending said armature adjacent said collector poles including a plurality of elements arranged with respect to said armature so that each element exerts a different force on said armature tending to urge said armature away from said poles, whereby the tractive force on the armature produced by the cross flux in response to a plurality of predetermined shaft speeds will overcome the different forces of the elements to move the armature toward said poles.

11. A speed sensing device comprising a shaft to be rotated, a rotor driven by the shaft, conductors carried by said rotor, main poles providing a main field flux which links the conductors in such a way as to be cut thereby to induce a voltage therein to cause a current to flow in said conductors when the rotor is rotated, the current in said conductors producing a cross flux in said rotor which flux acts at substantially right angles to the main field flux, collector poles arranged between the main poles and disposed with respect to the rotor to receive said cross flux, an armature for furnishing a magnetic path between the collector poles for conducting said cross flux therebetween, and means suspending said armature adjacent said collector poles including a plurality of springs arranged with respect to said armature so that each spring exerts a different force on said armature tending to urge said armature away from said poles, whereby the tractive force on the armature produced by the cross flux in response to a plurality of predetermined shaft speeds will overcome the different forces of the springs to move the armature toward said poles.

12. A speed sensing device comprising a shaft to be rotated, a rotor driven by the shaft, conductors carried by said rotor, main poles providing a main field flux which links the conductors in such a way as to be cut thereby to induce a voltage therein to cause a current to flow in said conductors when the rotor is rotated, the current in said conductors producing a cross flux in said rotor which flux acts at substantially right angles to the main field flux, collector poles arranged between the main poles and disposed with respect to the rotor to receive said cross flux, and an armature for furnishing a magnetic path between the collector poles for conducting said cross flux therebetween, and means suspending said armature adjacent said collector poles including a plurality of cantilever springs arranged with respect to said armature so that each spring exerts a different force on said armature tending to urge said armature away from said poles, whereby the tractive force on the armature produced by the cross flux in response to a plurality of predetermined shaft speeds will overcome the different forces of the springs to move the armature toward said poles, and adjusting means for varying the force of said springs.

13. A dynamoelectric machine comprising a shaft to be rotated, a rotor fixed to the shaft to be rotated thereby, conductors carried by said rotor, main poles providing a main field flux which links the conductors in a manner to be cut thereby to induce a voltage therein to cause a current to flow in said conductors when the rotor is rotated, said current producing a cross flux in the rotor, collector poles arranged adjacent the main poles and disposed in relation to the rotor to receive said cross flux, and an armature providing a magnetic circuit for said cross flux and constructed and arranged to be moved to vary the reluctance of said circuit in accordance with the intensity of the cross flux acting on said armature, whereby said shaft speed may be determined.

14. A speed sensing device comprising a member having conductors thereon, a member constituted to provide a main field flux which links the conductors, one of said members being rotatable to thereby cause a current to be induced in said conductors which produces a cross flux in the first mentioned member which acts at right angles to the main field flux, said cross flux being a function of the speed of the rotatable member, means arranged adjacent said first mentioned member for forming a magnetic circuit for said cross flux including a pair of collector poles, and an armature positioned adjacent said poles and constituted to be magnetically attracted thereto so as to be moved with respect thereto in response to predetermined speed of the rotatable member.

15. A speed sensing device comprising a member with conductors thereon, a member constituted to provide a main field flux which links the conductors, one of said members being rotatable to thereby cause a current to be induced in said conductors which produces a cross flux in the first mentioned member which acts at right angles to the main field flux, said cross flux being a function of the speed of said rotatable member, and means interposed between said members for forming a magnetic circuit for said cross flux including a movable element flexibly supported in said magnetic circuit and responsive to a predetermined speed of the rotatable member.

FRANKLIN O. WISMAN.
INGWALD ANDREASEN.

REFERENCES CITED

The following references are of record in the file of this patent:

UNITED STATES PATENTS

| Number | Name | Date |
|---|---|---|
| 2,187,369 | Uehling | Jan. 16, 1940 |